Patented Aug. 19, 1947

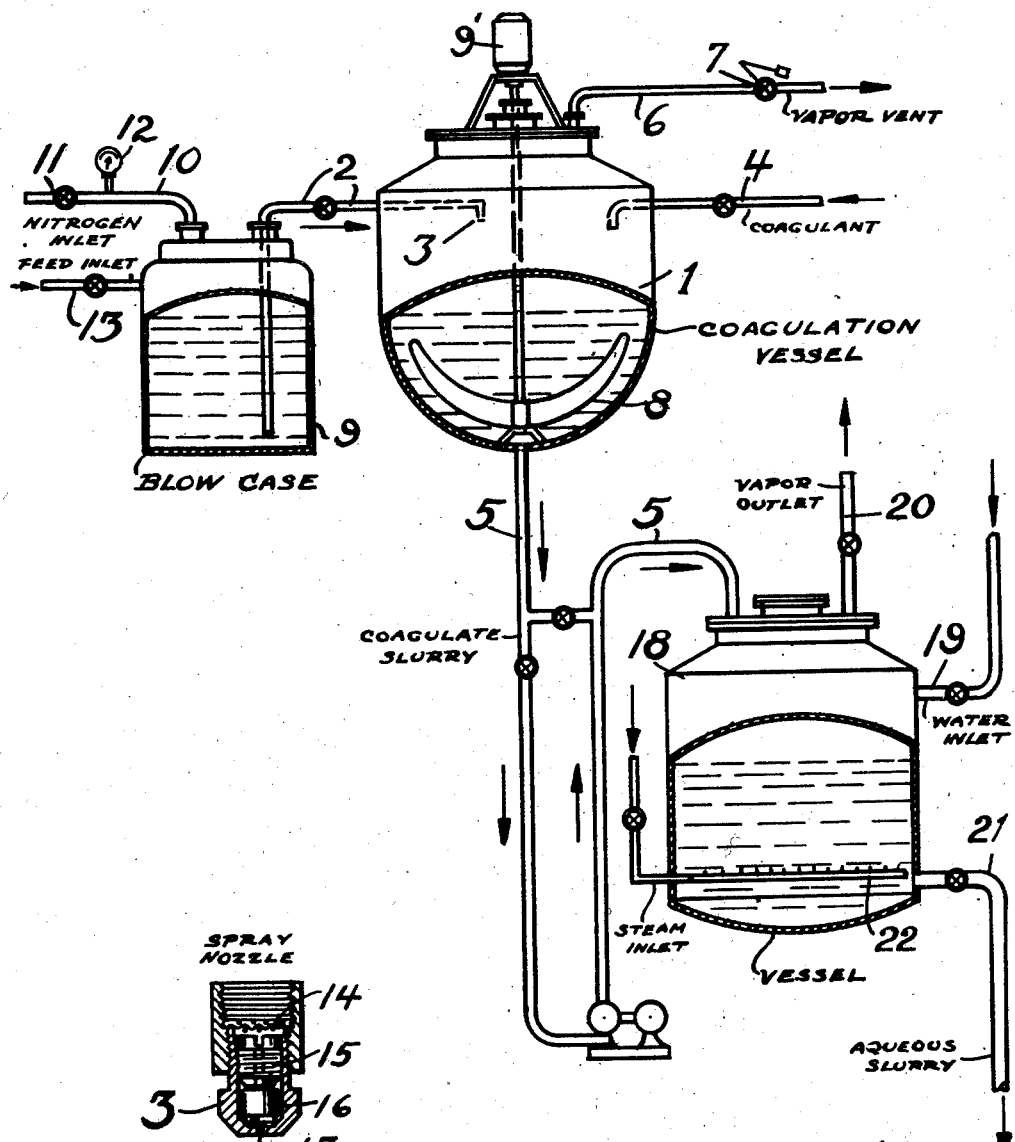

2,426,127

UNITED STATES PATENT OFFICE 2,426,127

METHOD OF COAGULATING LATICES OF SYNTHETIC RUBBERLIKE MATERIALS

Robert M. Thomas, Union, and Donald C. Field, Linden, N. J., assignors, by mesne assignments, to Jasco, Incorporated, a corporation of Louisiana Application October 29, 1941, Serial No. 416,978

13 Claims. (Cl. 260—93)

This invention relates to the preparation of synthetic rubber-like materials, and has the object of providing a method of coagulating synthetic rubber-like polymerization products more efficienctly and expeditiously.

The method of this invention is of technical and practical importance in the manufacture of synthetic rubber-like materials particularly of the "Buna" type by emulsion polymerization processes. It is of the particular importance as applied to the emulsion polymerization product of butadiene and acrylonitrile; butadiene and styrene; and other similar mixtures that contain the polymerizate highly dispersed in a liquid reaction medium requiring coagulation of the dispersed polymers for their recovery.

In a narrower sense, the high molecular weight materials having rubber-like elastic properties, which are of primary interest, are products whose basic copolymerized components comprise dienes (diolefins closely related to butadiene), such as isoprene, dimethyl butadiene, piperylene, or other polyolefins capable of interpolymerization with other polymerizable substances. Such products can be irreversibly converted from a plastic to elastic form by vulcanizing. They are identified, in general, by their higher stability as compared to natural rubber.

In accordance with the present invention, coagulation of a highly dispersed polymerizate, as in the form of a latex or emulsion, is effected by subdividing the emulsion or mixture of a liquid polymerization reaction medium containing a dispersed polymerizate to a controlled suitable extent and contacting the material thus subdivided with an immiscible liquid at temperatures sufficiently low to induce coagulation of the polymer and freezing of the liquid emulsion medium.

Known methods of coagulating emulsified synthetic rubber-like polymers involve a number of complications and are difficult to control for securing coagulates of optimum small particle size. The coagulates obtained tend to be gummy and lumpy, making washing difficult and even requiring special equipment, such as washing mills. For example, in the much used coagulation of synthetic polymers by the addition of cold brine, the salt must be of high purity and the adjustment of the pH value is highly critical.

Before the usual coagulation step, preliminary steps of stripping and removing unconverted reactants from the emulsion have been necessary. After the coagulation is accomplished with cold brine, much washing is required before the coagulate is satisfactorily free of brine and brine soaps, the brine having to be removed first and then the soaps. Furthermore, when certain agents known as modifiers are used in the polymerization reaction, and the polymer is precipitated by the usual methods, such as by cold brine, the coagulate is excessively sticky, thus rendering subsequent washing, filtering, and drying operations difficult or virtually impossible. With acids as the coagulants in place of salt, free acids liberated from the emulsifier are frequently very objectionable. With efforts to coagulate simply by freezing with no coagulating agent, a long time is required to obtain complete coagulation. Hence, the coagulation step is of a critical nature, because if the rubber-like product precipitated has an undesirable form, it is hardly possible to effectively alter its state, and the result is the loss of large batches of degraded materials.

It has been found that the coagulation method of the present invention satisfactorily avoids difficulties and complications of the previous methods and is superior thereto in a number of respects. Other advantages will be further explained in the following description.

In conducting the present method, the liquid mixture or latex containing the dispersed polymerizate is subdivided into particles of definitely small size in a convenient manner, as, for example, by means of a spray nozzle into or onto a cold liquid coagulating agent of proper character.

The liquid used as the coagulating agent is a material which is inert and immiscible with the liquid medium carrying the dispersed polymer as well as inert to the polymer under the coagulating conditions. It is contacted with the spray at a temperature sufficiently low to induce freezing of the liquid medium with attendant coagulation of the polymer.

The emulsion polymerization products are obtained in the form of a latex-like emulsion having as the dispersing liquid or continuous phase medium a polar substance, usually water. With such emulsions, the coagulant used in accordance with the present invention is preferably a highly volatile non-polar organic substance substantially immiscible with the water, such as hydrocarbons or non-polar alkyl halides, preferably those which are liquefied at below 0° C. and approximately in the range of —20° C. to 0° C.

For the purpose of illustration, a diagrammatic view is shown of suitable means for carrying out the coagulation step in Figure 1 of the drawing. Figure 2 is a more detailed and enlarged crosssectional view of a suitable spray nozzle for atomizing the emulsion.

Referring to the drawing, 1 designates the coagulation vessel having an emulsion inlet 2 fitted with spray injection nozzle 3 at the end within the vessel for introducing the emulsion in an atomized form. The liquid which serves as the freezing and coagulating agent (coagulant) is supplied to the coagulation vessel by inlet 4. The coagulation vessel has a bottom drain pipe 5 for withdrawal of the coagulated polymer in a slurry. A vapor vent line 6 equipped with an automatic pressure control valve 7 withdraws vapors of the coagulant from the upper part of vessel 1 for maintaining the desired pressure in the vessel. The coagulation vessel is also equipped with mechanical agitator 8 driven by motor 9', or other suitable means, to aid in distributing the emulsion particles within the coagulant bath.

The emulsion inlet line 2 may be supplied from blow case 9 in which is maintained a suitable pressure supplied by an inert gas, e. g., nitrogen, introduced by line 10 above the level of the emulsion, line 10 being equipped with regulating valve 11 and pressure gauge 12. Line 13 supplies the blow case with the emulsion directly or indirectly from the emulsion polymerization reaction zone. It is to be observed that the emulsion forced up under pressure from the bottom of blow case 9 through supply line 2 may be in a stream free from the inert gas used to place the emulsion under pressure.

In Figure 2, the enlarged view of the spray nozzle 3, previously referred to as being an end attachment to inlet 2 for atomizing the emulsion within the coagulation vessel 1 is shown to contain a filter screen 14 of about 40 mesh followed by valve 15, which may be adjusted to obtain a desired rate of flow of the emulsion stream, and a lower plug member 16 having spiral grooves through which the emulsion is forced into small spiral streams, which leave a small nozzle orifice 17 in an atomized cone shaped spray. In using this type of spray device nozzle, it was observed that the emulsion did not tend to coagulate in being sprayed and did not plug up the screen, and it was observed that the atomized droplets of emulsion were distributed in a suitably uniform manner onto the surface of the cold coagulant bath within the coagulation vessel.

With mechanical agitation of the coagulating liquid bath, the particles of emulsion spread onto the surface of the liquid bath were stirred into the liquid, forming therein a suspension of coagulated polymer having the appearance of small granular particles with interspersed ice crystals formed by the congealing of the water of the emulsion. As the spraying of the emulsion is continued for a period into a limited quantity of the coagulating liquid, the suspension becomes increasingly thicker until it reaches a slush-like consistency. However, fresh coagulant liquid may be introduced by inlet 4 at a sufficient rate to replenish any removed by vaporization and vapor withdrawal through line 6 or by removal through the drain pipe 5, so as to keep the slurry suitably flowable for withdrawal continuously or intermittently by drain pipe 5.

The coagulating liquid acting as a self-refrigerant evolves a substantial amount of vapors, particularly when it is kept substantially at its boiling or liquefaction point within the vessel 1. At the same time, such a coagulating liquid absorbs sensible heat from the atomized emulsion and latent heat developed by the freezing of the water in the emulsion particles. Thus, the coagulating liquid introduced at a suitable rate acts very efficiently in maintaining a constant and uniform temperature throughout the coagulation zone and maintains the coagulated and frozen particles of the emulsion satisfactorily suspended in the form of a slurry.

The pressure in the coagulation vessel is readily controlled with a pressure regulation valve 7 in the vapor vent line, if desired, for any specific low boiling coagulating liquid employed. The pressure may be maintained at substantially the equilibrium boiling and liquefaction point of the coagulating liquid. For example, with approximately one atmosphere of pressure maintained in the coagulation vessel using isobutylene as the coagulating liquid, the temperature at which coagulation is made to take place can be maintained quite constantly at about −6° C.; with liquid butadiene as the coagulating liquid under approximately one atmosphere of pressure, the coagulation temperature is maintained constantly at substantially its liquefaction temperature of about −5° C. Thus, it is possible to maintain any desired suitable temperature uniformly and automatically through the use of a specific coagulating liquid or mixture of such liquids under a fixed pressure.

Vapors evolved from the coagulating liquid and withdrawn through vapor line 6 at a suitable rate to maintain the desired pressure in vessel 1 may be recovered in any convenient manner for further use, as, for example, by recompressing and cooling to liquefy the vapors. The reliquefied vapors may be resupplied through line 4 to vessel 1. Thus, it is advantageous to employ as coagulating liquids, normally gaseous substances that are liquefied at temperatures which are not too far below the freezing point of the emulsion medium, and good economy in refrigeration is obtained. However, even very low boiling point substances, such as liquefied ethylene, may be used. On the other hand, higher boiling organic substances which are immiscible with the emulsion medium may be employed as the coagulating liquid with external refrigeration and added internal refrigerant, such as frozen carbon dioxide, but they are also less advantageously used than the preferred substances having liquefaction points below the freezing point of the emulsion medium. A particularly advantageous coagulating liquid for emulsions containing polymers from butadiene is liquefied butadiene, because its use simplifies the plant operation.

The coagulate suspended in the coagulation liquid as a flowable slurry is made to flow by gravity or by pumping to subsequent units for further processing as, for example, first a washing vessel 18 having a water inlet 19, a vapor vent 20 and aqueous slurry withdrawal line 21, which leads to a further processing unit as, for example, to carry out any further washing desired, filtering, and drying of the washed coagulate. Vessel 18 may also be equipped with a steam jet inlet 22 for injecting steam into the water and coagulate mixture in order to aid in stripping therefrom volatile materials, such as any unconverted reactants and the coagulating liquid. The vapors formed in vessel 18 may be led by the withdrawal vent line 20 to any suitable type of recovery apparatus and accordingly again the vaporized coagulating liquid flashed off in vessel 18 may be liquefied by compression and cooling to be recycled in the system.

For a suitable treatment of the coagulate slurry passed from vessel 1 to vessel 18, the vessel 18 may be partly filled with warm water, preferably distilled water, supplied by inlet 19. The coagulate slurry is run into the body of warm water, whereupon the volatile coagulating liquid is rapidly flashed into vapors which are withdrawn through pipe 20. In meeting with the warm water, the ice contained in the particles of slurry is rapidly melted and the coagulated polymer particles become distributed throughout the warm wash water and become substantially washed, so that the thus reslurried coagulate can immediately thereafter be subjected to filtration or centrifuging, in order to separate the water and materials dissolved in the water from the coagulated polymer in a satisfactorily washed condition. It has been noted that with the present method of coagulation, a single washing step is highly efficient and this may be properly attributed in part at least to the controlled fine size of the coagulate particles with less of the substances entrapped which have to be separated from the coagulate.

In coagulation procedures, it has been necessary to subject the emulsion from the polymerization zone to intermediate operations for removing unconverted reactants, e. g., the diolefin and any of the coreacting substances such as acrylonitrile, styrene or other polymerizable compounds having one or more double bonds, before subjecting the emulsion to coagulation, so as to arrest the interpolymerization reaction, for preventing undesired side reactions or over-polymerization. With the present method, unconverted reactants remaining in the emulsion can be recovered following the coagulation as in the washing step, if desired.

There are a number of methods which may be employed in obtaining the polymerization products which are to be subjected to coagulation for recovery of the synthetic rubber-like masses. In general, the emulsion polymerization is effected by admixing the reactants with water, a suitable catalyst, and an emulsifying agent of the water-soluble type, then maintaining the reaction mixture at a suitable temperature for a time sufficient to accomplish the desired degree of polymerization. Agitation of the reaction mixture helps to increase the rate of reaction. Catalysts, mainly of an oxidizing type, such as hydrogen peroxide, sodium perborate, potassium persulfate, or the like serve to promote the rate of reaction. Other agents may be added to modify or favorably influence the polymerization process, such as xanthogen disulfides, higher alkyl mercaptans (benzyl mercaptan or octyl mercaptan), or the like. Optimum temperatures for the reaction generally employed lie within the range of about 30° C. to 60° C. As a general rule, the water employed in the emulsion is in the major proportion of the reactants, and one reactant may be in various proportions with respect to any coreactant. Generally, the conversion requires a reaction time of several hours, from approximately 6 to 15 hours.

A stabilizing agent is added to the polymerization product, generally and preferably before the coagulation step. As effective stabilizers may be mentioned diphenylamine, phenyl-beta-naphthylamine, and condensation products of diaryl-amines with ketones.

The following example illustrate the invention without limiting it thereto:

A synthetic latex-like emulsion was prepared by reacting 30 parts by weight of conjugated butadiene with 10 parts by weight of acrylonitrile emulsified in 100 parts by weight of water containing 1.8% of sodium stearate as the emulsifier and 0.25% of chemically pure benzyl mercaptan. The reaction was carried out at about 40° C. for about 7¾ hours, and the yield obtained was about 75% of the theoretical yield. There was then added 0.6 part by weight of phenyl-beta-naphthylamine dispersed in a 1.8% solution of sodium stearate.

The polymerization product in the emulsion thus prepared was coagulated by atomizing the emulsion into a bath of liquid isobutylene at −6° C. thru a nozzle orifice less than 0.0001 inch in diameter. In the liquid isobutylene, a suspension of very fine particles of coagulate was formed. The coagulate was readily washed free of emulsifier by one reslurry operation with distilled water, and was thereafter easily filtered and readily dried in a current of heated air.

In the same manner but with liquefied butadiene at about −4° C., replacing the liquefied isobutylene as the coagulant, an equally satisfactory coagulation of the described product was accomplished.

The present method of coagulation was found excellently adaptable also for bringing about decomposition of a soap emulsifier when it is desired to have a small amount of free fatty acid liberated from the soap to remain with the polymer.

For example, in another run, the synthetic latex-like emulsion was sprayed into liquid isobutylene at about −6° C. containing a small amount of glacial acetic acid, and it was demonstrated that the fatty acid soap emulsifying agent, sodium stearate, was made to liberate free stearic acid which remained in the coagulate. Still under these conditions small particles of coagulate were obtained which were readily freed of sodium acetate and excess acetic acid by reslurrying in water.

Also, it was found that by this method, the amount of stearic acid formed could be well controlled to have the coagulate retain a properly limited amount of the stearic acid, e. g., less than 5 parts of the acid per 100 parts of coagulate, and preferably about 2 parts to 100 parts of coagulate.

In the foregoing examples, the products obtained after washing and drying the coagulate and subsequent compounding and curing with sulfur were found fully equal in tensile strength and elasticity to products obtained by the usual method of precipitating by means of acid, brine, or the like.

In further comparative runs it was demonstrated that the present coagulation method made the final products have superior tensile strength as compared to the brine method of precipitation. This was shown by applying the brine method of coagulation to one portion of an emulsion and the present method of coagulation to another portion of the emulsion. Each of the coagulates was treated in the same manner for washing and drying and tested for tensile strength after identical compounding and curing treatments. The brine precipitated coagulate product when compounded and cured showed a tensile strength of 2850 lbs./sq. in., whereas the coagulate formed by spraying the emulsion into liquid isobutylene at about −6° C. yielded a product having a tensile strength of 3680 lbs./sq. in.

The coagulated rubber-like masses thus obtainable have all the desired qualities of plasticity when worked on roll mills when being admixed with fillers or compounding ingredients, e. g., carbon black, sulfur, zinc oxide, stearic acid, vulcanizing agents, etc.

In addition to the benefits described, it is evident that there are numerous other benefits which may be derived from the present invention, e. g., substantial economy is obtained in reducing the amount of washing liquid used; also, in reducing the time, energy consumption, and amount of apparatus necessary in various stages. This coagulation technique is readily applicable with equipment at present available, and advantageously dispenses with the need of expensive special equipment for washing and drying since it very definitely can be used to form a coagulate in a form which is excellently adapted for a simple washing and drying. The improved coagulate products of controlled particle size and proper state of purity are highly desirable in compounding operations.

Although specific examples and preferred embodiments illustrating the invention have been given, it is to be understood that other modifications come within the spirit and scope of this invention as defined in the following claims.

We claim:

1. The process of coagulating a synthetic rubber latex consisting of a copolymer of a conjugated diolefin and an unsaturated comonomer in an aqueous dispersion which comprises introducing into a cooling zone a liquid refrigerant chemically inert to said latex and having a boiling point such that upon evaporation a temperature below the freezing point of said latex is obtained, evaporating said refrigerant in the cooling zone, and contacting a dispersed stream of said latex with said refrigerant in said zone whereby said latex is frozen, and thawing said frozen latex to separate synthetic rubber therefrom.

2. The process of coagulating synthetic rubber latices obtained by the copolymerization of a conjugated diolefin and an unsaturated comonomer in aqueous emulsion which comprises subdividing said latex into small drops, contacting said small drops with a non-polar organic coagulant liquid which is immiscible with aqueous media and inert to the polymer under the coagulating conditions and which is maintained by evaporation at a sufficiently low temperature to freeze water and thereby induce coagulation of the polymer particles.

3. The method as defined in claim 2 in which the coagulant liquid is liquefied isobutylene.

4. The method as defined in claim 2 in which the coagulant liquid is liquefied butadiene.

5. The process of coagulating synthetic rubber latices obtained by the copolymerization of a conjugated diolefin and an unsaturated comonomer in aqueous emulsion which comprises atomizing said latices in to small drops, distributing said drops into a bath of a volatile, non-polar organic coagulant liquid which is immiscible with aqueous media and inert to the polymer under the coagulating conditions and which is maintained by evaporation at a temperature sufficiently low to freeze the latex and form a slurry of ice and coagulated latex particles suspended in said organic coagulant liquid, passing said slurry into contact with water at a temperature sufficiently high to melt the ice particles and vaporize said organic liquid while the coagulated polymer forms a second slurry by suspension in the warm water, and stripping the volatile coagulant liquid from said second slurry.

6. The process as defined in claim 5 wherein the copolymer is separated from the second water slurry in washed condition and then dried.

7. The process as defined in claim 5 wherein the copolymer is prepared from a mixture of butadiene and acrylonitrile.

8. The process as defined in claim 5 wherein the copolymer is prepared from a mixture of butadiene and styrene.

9. The process of coagulating synthetic rubber latices obtained by the copolymerization of a conjugated diolefin and an unsaturated comonomer in aqueous emulsion using a fatty acid soap emulsifier which comprises atomizing said latices into small drops, distributing said drops into a bath of a volatile, non-polar, organic coagulant liquid which is immiscible with aqueous media and inert to the polymer under the coagulating conditions and which contains a small amount of an agent which liberates fatty acid from said soap, and which coagulant liquid is maintained by evaporation at a temperature sufficiently low to freeze the latex and thereby induce coagulation of the polymer particles and recovering the coagulated polymer particles containing from 2 to 5 parts of said fatty acid per 100 parts of coagulate.

10. The process as defined in claim 9 wherein the copolymer is prepared from a mixture of butadiene and acrylonitrile.

11. The process as defined in claim 10 wherein the organic coagulant liquid contains a small amount of glacial acetic acid.

12. The process as defined in claim 9 wherein the copolymer is prepared from a mixture of butadiene and styrene.

13. The process as defined in claim 12 wherein the organic coagulant liquid contains a small amount of glacial acetic acid.

ROBERT M. THOMAS.
DONALD C. FIELD.

REFERENCES CITED

The following references are of record in the file of this patent:

UNITED STATES PATENTS

| Number | Name | Date |
| --- | --- | --- |
| 2,234,204 | Starkweather et al. | Mar. 11, 1941 |
| 2,187,146 | Calcott et al. | Jan. 16, 1940 |
| 2,085,524 | DeSimo | June 29, 1937 |